April 5, 1966 W. H. WICKERSHAM 3,244,381
CONTROL OF FLEXIBLE LINES WITHIN A REEL
Filed April 25, 1963
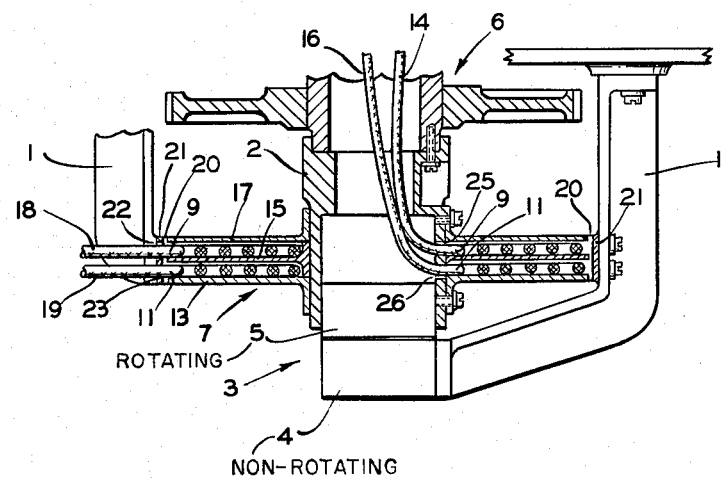
INVENTOR.
WILFRED H. WICKERSHAM
BY
ATTORNEY

# United States Patent Office 3,244,381
Patented Apr. 5, 1966

3,244,381
CONTROL OF FLEXIBLE LINES WITHIN A REEL
Wilfred H. Wickersham, Upper Saddle River, N.J., assignor to The Bendix Corporation, Teterboro, N.J., a corporation of Delaware
Filed Apr. 25, 1963, Ser. No. 275,656
3 Claims. (Cl. 242—100.1)

This invention relates to a means for providing limited motion control of flexible transmission lines, cables, and tubes and is particularly directed to a novel means for providing flexible transmission lines, tubes, or cables wound in spiral form as a transmission medium between a stationary member and a device with limited angular rotation relative to the stationary member, together with means for conducting the flexible transmission lines, cables, or tubes through a motional axis of the device.

Heretofore, transmission lines have been taken through a given axis by means of slip rings or rotary joints particularly where continuous rotation is involved. For quite limited angular motion, it has been often found desirable to use a flexible cable or tube or other suitable transmission line for reasons of greater reliability, lower cost, lower noise, or space and weight considerations. When the limited angular motion approaches or exceeds 360°, the advantages of the flexible transmission line, cable or tube are often overbalanced by problems related to the control of the slack and reduced life expectancy from severe flexing.

An object of the invention is to provide a novel means for controlling flexible transmission lines, cables, or tubes so as to avoid the aforenoted problem.

Another object of the invention is to control the flexible transmission line so that there is a minimum change in the bending radius for the full range of angular rotation which will contribute to the greatest life expectancy.

Another object of the invention is to so minimize the space allocated to this function as to provide it with a favorable form factor and in which, for example, flexible connecting members may have a relative angular rotation of three hundred and sixty degrees more or less as may be required.

These and other objects and features of the invention are pointed out in the following description in terms of the embodiment thereof which is shown in the accompanying drawing. It is to be understood, however, that the drawing is for the purpose of illustration only and is not a definition of the limits of the invention.

The drawing is a fragmentary sectional view illustrating a novel means for effecting a dual coaxial flexible transmission line, cable, or tube wrapping about an axis of rotation together with novel means for conducting the flexible transmission lines, cables, or tubes through the motional axes thereof.

Referring to the drawing, there is indicated by the numeral 1, a supporting member fixedly mounted in stationary relation to a rotatable tubular member 2 having one end thereof supported by a rotary bearing 3 including a nonrotating element 4 carried by the supporting member 1 and a rotatable element 5 affixed to the end of the tubular member 2. There are further secured to the tubular member 2 a rotatable device 6 and a rotatable drum or reel 7.

The reel 7 includes radially extending annular plates 13, 15, and 17 arranged in spaced relation so that there may be wound between the plates 13, 15, and 17 in spiral form flexible transmission lines, cables, or tubes 9 and 11. The lines 9 and 11 have inner end portions 14 and 16 operatively connected to the rotatable device 6 by suitable means not shown and outer end portions 18 and 19 operatively connected to the stationary supporting member 1.

The plates 13, 15, and 17 may be coated with a suitable lubricant so that the transmission lines 9 and 11 may freely slide on the plates 13, 15, and 17 with a minimum of friction between the jackets of the transmission lines and the supporting plates to thereby contribute to the smooth coiling and uncoiling of the transmission lines for thereby increasing the life expectancy of the same. These plates 13, 15, and 17 may be coated with a suitable plastic lubricant such as Teflon and the jackets of the transmission lines 9 and 11 may be covered with a lubricant such as powdered graphite.

A function of the plates 13, 15, and 17 immediately adjacent to the spiral transmission lines, cables, or tubes 9 and 11 is to prevent one turn of the line from crossing over an adjacent turn of the line. For this reason adjacent plates are spaced from one another a distance slightly greater than the thickness of the transmission line and less than twice the thickness of the transmission line. The plates confine the transmission line in a direction axially of members 1 and 2 but permit free movement of the transmission line radially of the members upon relative rotation of the members. The transmission line forms a substantially tight spiral when the members are relatively rotated to their limit in one direction and a substantially loose spiral when the members are relatively rotated to their limit in the opposite direction. A ring 21 is attached to the stationary member 1 and has an inner circumferential surface positioned in spaced relation at 20 from adjacent peripheral edges of the annular plates 13, 15, and 17 so as to prevent any tendency of the looped lines 9 and 11 to slide out of the space between their supporting plates 13–15 and 15–17.

In actual operation, the behavior of these flexible transmission lines, cables, or tubes 9 and 11 is similar to the action of a hairspring of a watch except that the same are so arranged as not to apply appreciable restraint and/or torque between the stationary member 1 and the rotating device 6.

Upon angular rotation of the drum or reel 7 being extreme in one direction, the spiral convolutions would be relatively close together or tightly wound while with angular rotation of the drum or reel 7 at an extreme in the other direction, the spiral convolutions are relatively far apart or loosely wound. The various dimensions, including the number of turns, may be established by the design so that a change in radius of curvature of the flexible transmission line, cable, or tubes 9 and 11, between the limits of angular rotation, is compatible with the flexing characteristics of the flexible transmission line, cable or tube necessary to provide the required life expectancy.

Through the control means shown, the change in radius or curvature of the flexible transmission line, cable, or tube with angular rotation would be both gradual and uniform which is desirable for the greatest life expectancy. Further, the outer end portions 18 and 19 of the transmission lines 9 and 11 extend through radial openings 22 and 23 in the annular ring 21 and may be connected to suitable base connectors, not shown, while the inner end portions 14 and 16 of the flexible transmission lines 9 and 11 are arranged so as to project through radial openings 25 and 26 in the tubular member 2 so that the flexible transmission lines 9 and 11 may extend axially in the tubular member 2 along the motional axis of the tubular member 2.

There is thus provided a means for establishing and controlling a flexible transmission line, cable (single or multi-conductor) or tube (pneumatic, hydraulic, etc.) which will serve as a transmission medium between a stationary element 1 and the device 6 with limited angular rotation. Further, by the novel means herein provided, the flexible transmission lines, cables, or tubes, 9 and 11 may project axially through the motional axis of the movable tubular member 2 and between a supporting member and a device having greater relative angular rotation with less flexing than is practicable under prior customary design procedures. While only two transmission lines are depicted, it is apparent that this arrangement is equally applicable to a multiplicity of transmission lines, which retain a form factor favorable to compact design.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. Means for providing a connection between two relatively rotatable members, comprising a flexible transmission line extending between the members and having a portion of substantially fixed length arranged in spiral form, plate-like elements carried by at least one of the members and spaced from one another a distance greater than the thickness of the transmission line and less than twice the thickness of the transmission line and receiving the transmission line in a multiple turn spiral convolution therebetween, lubricant means between the plate-like elements and the multiple turn spiral convolution transmission line so that the transmission line may freely slide on the plate-like elements, the elements confining the transmission line in one direction to prevent adjacent turns of the transmission line from crossing over one another, the transmission line otherwise being unconfined and being arranged between the elements to form a substantially tight spiral when the members are relatively rotated to their limit in one direction and a substantially loose spiral when the members are relatively rotated to their limit in the opposite direction, and said line having such dimensions and number of turns in said multiple turn spiral convolution that a uniform change in radius of curvature of the flexible transmission line in said convolution may be effected upon said members being relatively rotated between said limits.

2. Means for providing a plurality of connections between two relatively rotatable members with limited motion, comprising a plurality of flexible transmission lines extending between the members and each having a portion of substantially fixed length arranged in a multiple turn spiral convolution, plate-like elements carried by the members and adjacent elements receiving one of the transmission lines in spiral form therebetween and being spaced from one another a distance greater than the thickness of the transmission line and less than twice the thickness of the transmission line, the elements confining the transmission lines in one direction to prevent adjacent turns of the transmission lines from crossing over one another, the transmission lines otherwise being unconfined and being arranged to move freely between the elements to form substantially tight spirals when the members are relatively rotated to their limit in one direction and substantially loose spirals when the members are relatively rotated to their limit in the opposite direction, and said lines having such dimensions and number of turns in said multiple turn spiral convolutions that a uniform change in radius of curvature of the flexible transmission lines in said convolutions may be effected upon said members being relatively rotated between said limits.

3. In combination, two relatively rotatable members, a flexible transmission line connecting the members and having a portion of substantially fixed length arranged in a multiple turn spiral convolution, plate-like elements carried by at least one of the members and spaced from one another a distance slightly greater than the thickness of the transmission line and less than twice the thickness of the transmission line and receiving the spiral portion of the transmission line therebetween, the elements confining the transmission line in one direction to prevent adjacent turns of the transmission line from crossing over one another, the transmission line being otherwise unconfined and being arranged to move freely between the elements to form a substantially tight spiral when the members are relatively rotated to their limit in one direction and a substantially loose spiral when the members are relatively rotated to their limit in the opposite direction, and said line having such dimensions and number of turns in said multiple turn spiral convolution that a uniform change in radius of curvature of the flexible transmission line in said convolution may be effected upon said members being relatively rotated between said limits.

References Cited by the Examiner

UNITED STATES PATENTS

| | | | |
|---|---|---|---|
| 1,153,829 | 9/1915 | Ruechert | 242—107.1 |
| 1,186,131 | 6/1916 | Replogle | 242—100.1 |
| 1,868,409 | 7/1932 | Crispen | 242—107.1 |
| 2,521,226 | 9/1950 | Keller | 242—100.1 |

FOREIGN PATENTS

| | | |
|---|---|---|
| 156,370 | 5/1954 | Australia. |
| 658,176 | 1/1929 | France. |
| 697,640 | 9/1953 | Great Britain. |

References Cited by the Applicant

UNITED STATES PATENTS

| | | |
|---|---|---|
| 977,192 | 11/1910 | Hull. |
| 1,247,358 | 11/1917 | Zwilling. |
| 1,906,456 | 5/1933 | Farrand. |
| 2,438,082 | 3/1948 | Wester et al. |
| 2,588,410 | 3/1952 | Price et al. |
| 2,682,609 | 6/1954 | Wampler. |
| 2,949,596 | 8/1960 | Levene. |
| 3,001,034 | 9/1961 | Aitkens. |

MERVIN STEIN, *Primary Examiner.*

N. L. MINTZ, *Assistant Examiner.*